United States Patent [19]

Dean

[11] Patent Number: 4,593,074

[45] Date of Patent: Jun. 3, 1986

[54] ELASTOMER HAVING RANDOM PEROXIDE FUNCTIONALITY AND METHOD

[75] Inventor: Barry D. Dean, Broomall, Pa.

[73] Assignee: Atlantic Richfield Company, Los Angeles, Calif.

[21] Appl. No.: 589,368

[22] Filed: Mar. 14, 1984

[51] Int. Cl.$^4$ .............................................. C08F 8/00
[52] U.S. Cl. ............................... 525/331.7; 525/337.8; 525/333.1; 525/366; 525/370
[58] Field of Search ................................ 525/366, 370

[56] References Cited

U.S. PATENT DOCUMENTS 3,313,793  4/1967  De LaMare et al. ................ 525/370
3,489,822  1/1970  Witt et al. ........................... 525/292

Primary Examiner—Joseph L. Schofer
Assistant Examiner—Bernard Lipman
Attorney, Agent, or Firm—Dennis M. Kozak

[57] ABSTRACT

A process for generating random dialkyl or alkyl aryl peroxide functionality on elastomers is disclosed. Generally, the process involves dissolving an elastomer in a solvent followed by treating the resulting solution with an oxidizing agent in the presence of a catalyst. In a preferred embodiment, the oxidizing agent is a an alkyl or aryl hydroperoxide and the catalyst is a Group VIIa, VIII, Ib or IIb metal.

16 Claims, No Drawings

ELASTOMER HAVING RANDOM PEROXIDE FUNCTIONALITY AND METHOD

This invention relates to elastomers.

More specifically, this invention relates to elastomers which possess random dialkyl or alkyl aryl peroxide functionality and to their method of manufacture.

In one of its more specific aspects this invention pertains to a unique process for randomly generating dialkyl or alkyl aryl peroxide functionality on an olefin/α-olefin/non-conjugated diene (EPDM) terpolymer.

Reference is hereby made to copending application Ser. No. 557,975, filed Dec. 5, 1983, now U.S. Pat. No. 4,491,647.

The prior art teaches a variety of techniques permitting peroxide functionalization of olefin/α-olefin co- and terpolymers. U.S. Pat. Nos. 3,458,598; 3,652,724; 3,739,042; and 3,949,018 teach peroxide functionalization of only the polymer chain end. Particularly, U.S. Pat. No. 3,949,018 teaches the end group peroxidation of a living olefin/α-olefin polymer chain. The mediating species is a transition metal coordinated to the growing end of the olefin/α-olefin polymer. According to these teachings a maximum of two peroxide groups per polymer chain is possible, more accurately a maximum of two peroxide groups only at the ends of the polymer chain. U.S. Pat. No. 3,800,007 teaches polymer end group functionalization (peroxidation) through the use of a specially designed peroxide containing chain transfer agent. This approach permits only polymer chain end functionalization. U.S. Pat. Nos. 3,288,739 and 3,489,822 as well as British Pat. No. 877,443 teach random peroxidation of olefin/α-olefin copolymers as well as olefin/α-olefin/non-conjugated diene terpolymers with molecular oxygen as the source for the active peroxide oxygen in the form of hydroperoxides.

The present invention provides a novel method for generating random dialkyl or alkyl aryl peroxide functionality on elastomers. The resulting peroxidized elastomers are also novel.

According to this invention there is provided a method for generating dialkyl or alkyl aryl peroxide functionality on an elastomer which comprises forming a solution of a solvent and an elastomer having pendant allylic, benzylic or conjugated unsaturation at levels within the range of from about 1 to about 20 weight percent, and reacting the resulting solution with an alkyl or aryl hydroperoxide in the presence of a Group VIIa, VIII, Ib or IIb metal catalyst.

Also, according to this invention there is provided an elastomer possessing random dialkyl or alkyl aryl peroxide functionality comprising the reaction product of a solution of a solvent and an elastomer having pendant allylic, benzylic or conjugated unsaturation at levels within the range of from about 1 to about 20 weight percent, and an alkyl or aryl hydroperoxide related in the presence of a Group VIIa, VIII, Ib or IIb metal catalyst. In a preferred embodiment of this invention, the elastomer is an olefin/α-olefin/non-conjugated diene terpolymer.

According to this invention there is also provided a random polymer having the general formula:

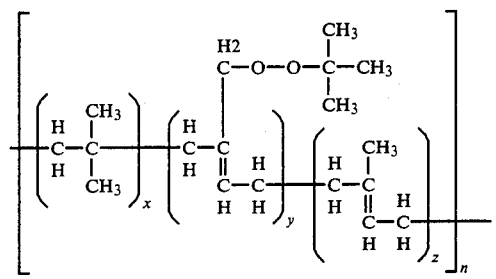

wherein y and z combined comprise up to 20 wt % of the polymer and are randomly distributed along the polymer backbone and n is an integer greater than 100.

According to this invention there is also provided a random polymer having the general formula:

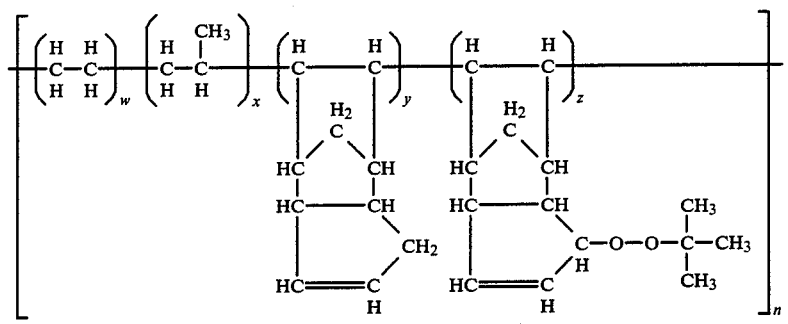

wherein y and z combined comprise up to 20 wt % of the polymer and are randomly distributed along the backbone and n is an integer greater than 100.

According to this invention there is also provided a random polymer having the general formula:

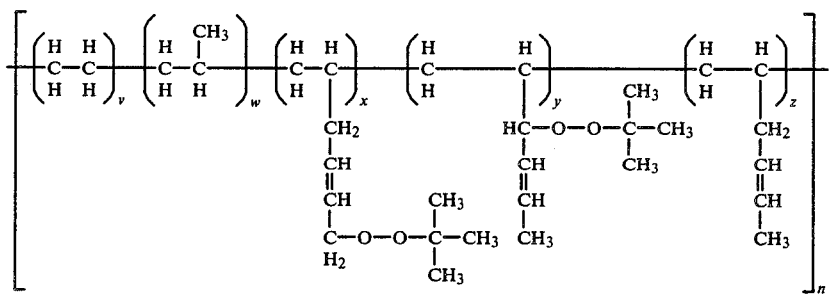

wherein x and y combined comprise up to 20 wt % of the polymer and are randomly distributed along the polymer backbone and n is an integer greater than 100.

In the practice of this invention, any elastomer having pendant allylic, benzylic or conjugated unsaturation at levels within the range of from about 1 to about 20 wt % is suitable for use.

Particularly suitable are olefin/α-olefin/non-conjugated terpolymers, generally known as EPDM rubbers and butyl rubber. EPDM rubbers are preferred.

More specifically, the EPDM rubbers suitable for use in making the peroxidized EPDM of this invention are based on mono olefins having the structural formula $CH_2=CHR$ in which R may be a hydrogen atom or a saturated alkyl group such as methyl, ethyl, n-propyl, isopropyl and the like. In addition, the EPDM rubbers are based on non-conjugated straight-chain or cyclic diene hydrocarbons which are copolymerizable with the above alpha-mono olefins. Examples of suitable non-conjugated straight-chain diene hydrocarbons co-polymerizable with alpha-mono olefins are 1,4-pentadiene, 1,4-hexadiene, 1,5-hexadiene and the like. Examples of suitable cyclic diene hydrocarbons are bicyclo[2,2,1] hepta-2,5-diene, dicyclopentadiene, tricyclopentadiene and tetracyclopentadiene. EPDM rubbers most preferred are terpolymer structures in which two mono olefins, ethylene and propylene, and one non-conjugated diene hydrocarbon are used. Most preferred for the non-conjugated diene hydrocarbon are 1,4-hexadiene and dicyclopentadiene. The EPDM rubber should comprise 1 to 15% by weight of the non-conjugated diene hydrocarbon and 85 to 99% by weight of the mono olefins. The preferred ratio of the mono olefins, ethylene and propylene, should be 20/80 to 80/20, preferably between 35/65 to 65/35. Ethylene-propylene-ethylidene norbornene is not suitable for use in the practice of this invention.

Methods for making these rubbers are well known and thoroughly described in U.S. Pat. No. 3,000,866 and U.S. Pat. No. 3,000,867, the teachings of which are incorporated herein by reference thereto.

In the practice of this invention, the elastomer is dissolved in a solvent, preferably at a temperature within the range of from about at 60°–80° C. The resulting rubber solution is then treated with an oxidizing agent in the presence of a catalyst. The oxidizing agent is an alkyl or aryl hydroperoxide but, most preferably is t-butyl hydroperoxide. The catalyst is selected from any metal in Group VIIa, VIII, Ib or IIb with the appropriate choice of counter ion so as to promote solubility of the catalyst in the rubber solution. A small quantity of tetrahydrofuran or ethanol (absolute) may be added to enhance the solubility of the catalyst in the rubber solution. The peroxidation reaction is run for from about 4 to about 20 hours at a temperature preferably within the range of from about 60° to about 80° C.

Suitable solvents for dissolving the elastomer are various aromatic solvents such as benzene, t-butylbenzene, toluene, xylenes, and halogenated benzenes, such as chlorobenzene; however, most preferred are chlorobenzene and t-butylbenzene.

Catalysts based on metals of Group VIIa, VIII, Ib or IIb are suitable but most preferred are either cobalt (Group VIII) or copper (Group Ib). Preferred catalysts are Cobalt (II) acetate, cobalt (II) propionate, cobalt (II) acetyl acetonate, cobalt (II) 2-ethyl hexanoate, cobalt (II) naphthenate, copper (I) acetate, copper (I) chloride, copper (I) acetylacetonate, copper (I) napthenate, or copper (I) ethylacetoacetate. Most preferred are cobalt (II) acetylacetonate, cobalt (II) napthenate, copper (I) acetate, copper (I) chloride and copper (I) acetyl acetonate.

Peroxidized elastomers prepared by the method of this invention will typically exhibit peroxide levels of from about 0.05 to about 0.1 wt % and are useful as self vulcanizing elastomers, polymeric curing agents for unsaturated polyesters, or as polymeric peroxides to initiate the polymerization of monomers which polymerize through a free radical mechanism. See for example U.S. Pat. No. 3,489,822 which teaches EPDM rubbers grafted with plastic matrices.

Having described the materials and method of this invention, reference is now made to the following examples which serve to demonstrate the preparation of peroxidized rubbers according to the invention.

EXAMPLE 1

This example serves to demonstrate the preparation of a peroxidized EPDM rubber utilizing a copper (I) catalyst.

In a 4-liter resin kettle 400 grams of an ethylene/propylene/dicyclopentadiene rubber containing 8.5 percent by weight of dicyclopentadiene termonomer were dissolved in 2500 grams of a solvent mixture comprised of 75 percent t-butylbenzene and 25% chlorobenzene. The EPDM rubber dissolved readily in two hours by heating the solution to 70° C. The resin kettle was charged with 120 grams of 40% anhydrous t-butylhydroperoxide in toluene[1] solution. Immediately after the addition of the hydroperoxide solution, 6.2 grams of a 50:50 (by weight) mixture of cuprous chloride and cuprous acetate dissolved in 20–30 ml of tetrahydrofuran or 20–30 ml of absolute ethanol. The reaction mixture was maintained at 70° C. for 24 hours. The EPDM rubber solution was precipitated into a threefold excess of methanol using a high speed Waring Blender for agitation. The EPDM rubber was dried in vacuo at 25° C. and then dissolved in toluene and precipitated into methanol a second time. The peroxidized EPDM rubber was dried in vacuo at 25° C. for 48 hours.

[1] Prepared by extraction of a 70% t-butyl-hydroperoxide water solution with toluene according to the procedure described by K. B. Sharpless, et al, *Journal of Organic Chemistry*, 1983, 48 3607.

The level of active oxygen in the EPDM rubber was determined based on iodine liberation in a modification of method III as described by R. D. Mair and Alda J. Graupner; *Analytical Chemistry*, 1964, 36, 194. The active oxygen level was determined to be 836 ppm.

EXAMPLE 2

This example serves to demonstrate the preparation of a peroxidized EPDM rubber utilizing a cobalt (II) catalyst.

In a 4-liter resin kettle 400 grams of an ethylene/propylene/dicyclopentadiene or 1,4-hexadiene rubber containing 6-10 percent by weight of the non-conjugated diene termonomer were dissolved in 2700 grams of chlorobenzene. The EPDM rubber dissolved readily in three and one half hours by heating the solution to 70° C. The resin kettle was charged with 120 grams of a 40% anhydrous t-butyl hydroperoxide in toluene solution (prepared as in Example 1). Immediately after the addition of the hydroperoxide solution, 20 grams of a 6% cobalt solution as cobaltous naphthenate in mineral spirits and 1.7 grams of cobaltous acetylacetonate dissolved in 22 milliliters of tetrahydrofuran was added. The reaction mixture was maintained at 70°-72° C. for 8 hours. The EPDM rubber solution was precipitated into a threefold excess of methanol using a high speed Waring Blender for agitation. The EPDM rubber was dried in vacuo at 25° C. and then dissolved in toluene and precipitated into methanol a second time. The peroxidized EPDM rubber was dried in vacuo at 25° C. for 48 hours. The level of active oxygen as determined by the method cited in Example 1 was 1172 ppm.

It will be evident from the foregoing that various modifications can be made to this invention. Such, however, are considered as being within the scope of the invention.

What is claimed is:

1. A method for generating random dialkyl or alkyl aryl peroxide functionality on an elastomer which comprises forming a solution of a solvent and an elastomer having pendant alkylic, benzylic or conjugated unsaturation at levels within the range of from about 1 to about 20 weight percent, and reacting the resulting solution with an alkyl or aryl hydroperoxide in the presence of a Group VIIa, VIII, Ib or IIb metal catalysts, wherein said elastomer is selected from the group consisting of butyl rubber and an olefin/α-olefin/non-conjugated diene terpolymer with the proviso that the olefin/α-olefin/non-conjugated diene terpolymer cannot be ethylene/propylene/ethylidene norbornene.

2. The method of claim 1 in which said solvent is an aromatic solvent.

3. The method of claim 1 in which said hydroperoxide is t-butyl hydroperoxide.

4. The method of claim 1 in which the metal catalyst counter ion is selected to promote the solubility of the catalyst in the solution.

5. The method of claim 1 in which said catalyst is a cobalt catalyst.

6. The method of claim 1 in which said catalyst is a copper catalyst.

7. The method of claim 4 in which said counter ion is selected from the group consisting of acetate, propionate, acetyl acetonate, 2-ethyl hexanoate, naphthenate, ethylacetoacetate, and chloride.

8. The method of claim 4 in which said catalyst is cobalt (II) acetylacetonate.

9. The method of claim 4 in which said catalyst is cobalt (II) naphthenate.

10. The method of claim 4 in which said catalyst is copper (I) acetate.

11. The method of claim 4 in which said catalyst is copper (I) chloride.

12. The method of claim 4 in which said catlayst is copper (I) acetyl acetonate.

13. The method of claim 2 in which said solvent is chlorobenzene.

14. The method of claim 2 in which said solvent is t-butylbenzene.

15. A peroxidized elastomer possessing random dialkyl peroxide functionality comprising the reaction product of a solution of an aromatic solvent and an elastomer having pendant alkylic, benzylic or conjugated unsaturation at levels within the range of from about 1 to about 20 weight percent and an alkyl or aryl hydroperoxide in the presence of a Group VII, VIII, Ib or IIb metal catalyst, wherein said elastomer is selected from the group consisting of butyl rubber and an olefin/α-olefin/non-conjugated diene terpolymer with the proviso that the olefin/α-olefin/non-conjugated diene terpolymer cannot be ethylene/propylene/ethylidene norbornene.

16. The peroxidized elastomer of claim 15 having a peroxide level of from about 0.05 to about 0.1 weight percent.

* * * * *